Figure 1:
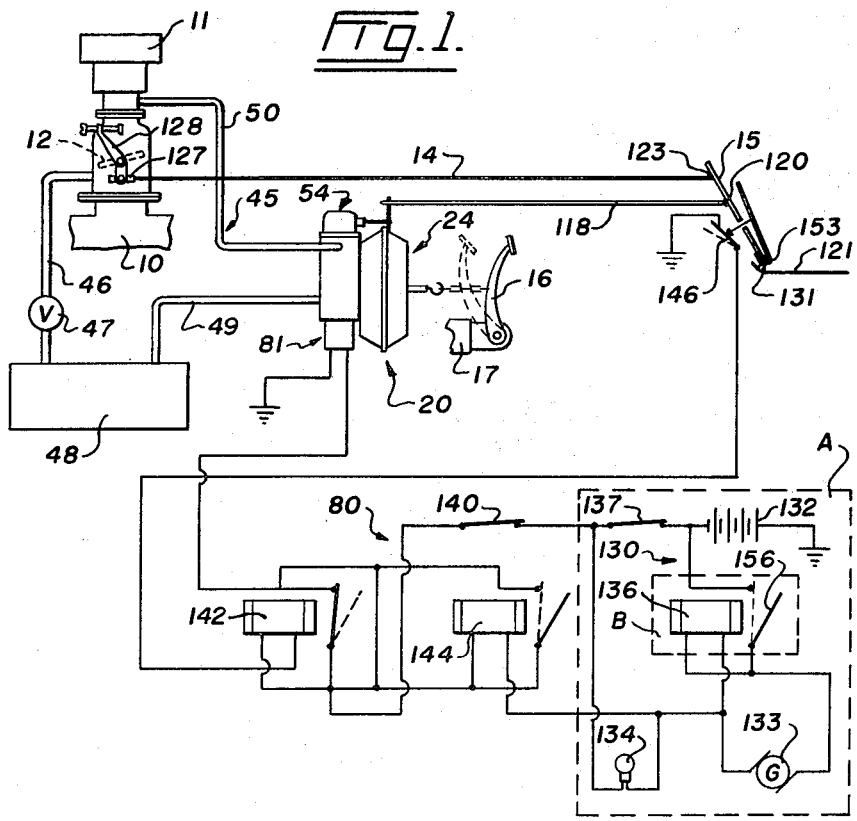

United States Patent
Grassmuck

[15] 3,698,525
[45] Oct. 17, 1972

[54] CLUTCH AND THROTTLE CONTROL

[72] Inventor: August W. T. Grassmuck, 3870-216th Street, R.R. # 1, Langley, British Columbia, Canada

[22] Filed: April 12, 1971

[21] Appl. No.: 132,969

[52] U.S. Cl. ................................ 192/.075, 192/91 R
[51] Int. Cl. ............................................. B60k 21/00
[58] Field of Search .................... 192/91 R, .07, .075

[56] References Cited

UNITED STATES PATENTS

| | | | |
|---|---|---|---|
| 2,665,785 | 1/1954 | Prather | 192/.075 X |
| 2,057,740 | 10/1936 | Price et al. | 192/.075 X |
| 2,296,282 | 9/1942 | Hruska | 192/.075 |
| 2,605,872 | 8/1952 | Prather | 192/91 R X |

*Primary Examiner*—Benjamin W. Wyche
*Attorney*—Fetherstonhaugh & Co.

[57] ABSTRACT

A mechanism attachable to a vehicle to convert a friction clutch, which normally is manually operated, to one which will operate automatically at the discretion of the driver. The mechanism includes a clutch operating unit powered by a difference in pressure developed by the engine and a dual control valve for the unit which is actuated simultaneously with the gas pedal to progressively engage and disengage the clutch as the gas pedal is depressed and released to vary the speed of the engine.

3 Claims, 11 Drawing Figures

INVENTOR
AUGUST W. T. GRASSMUCK
BY
Fetherstonhaugh & Co.
ATTORNEYS

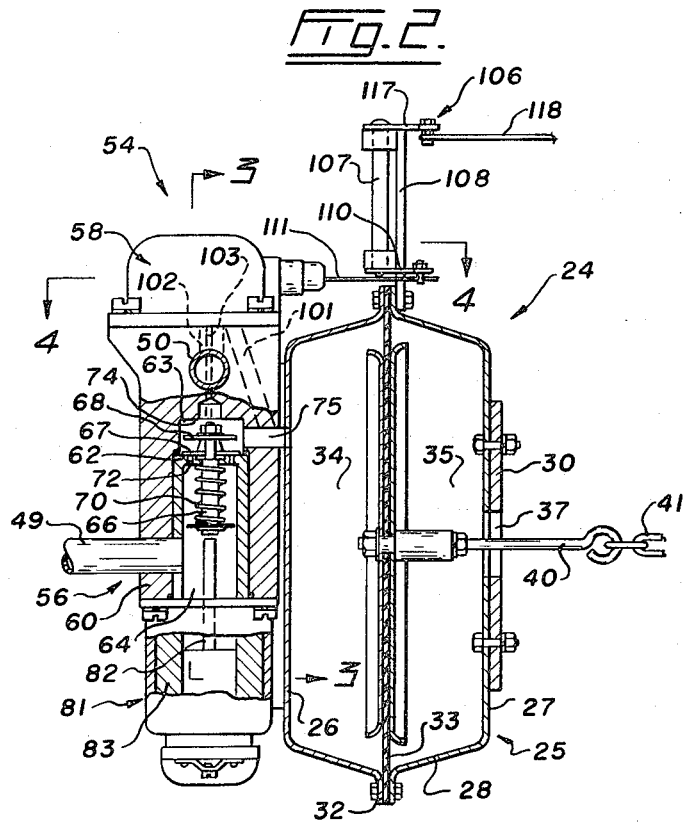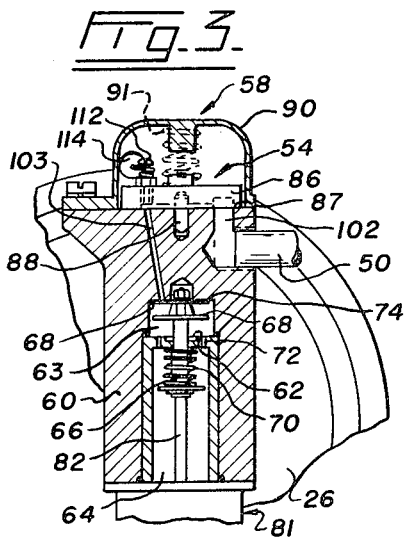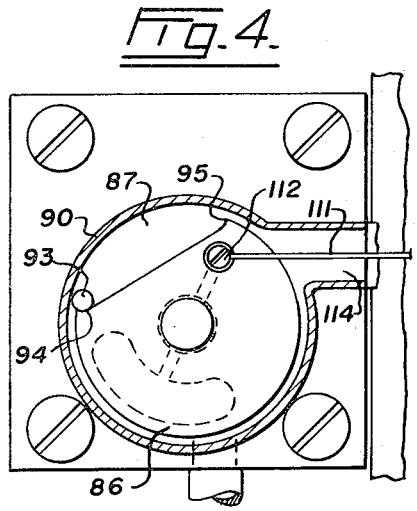

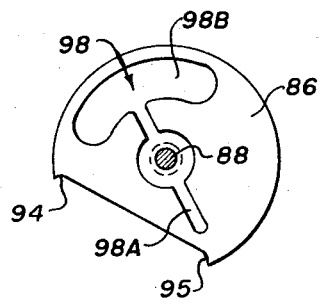
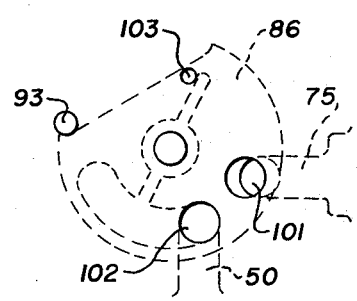
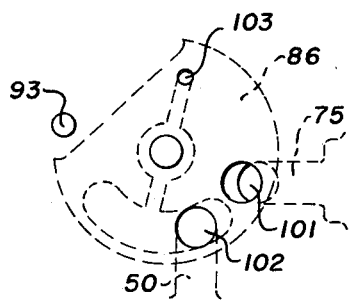
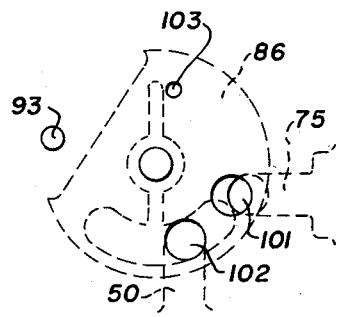
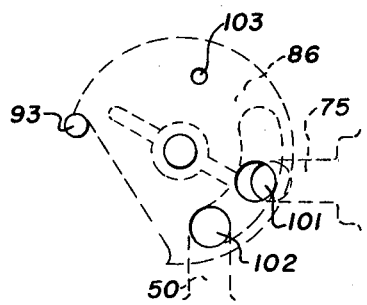
INVENTOR
AUGUST W. T. GRASSMUCK

CLUTCH AND THROTTLE CONTROL

My invention relates generally to mechanism for controlling the operation of a vehicle clutch and more particularly to an attachment for a car which will convert it from one with a conventional gear shift to one in which gears can be shifted in the manner of a stick-shift vehicle.

A number of clutch control systems have hitherto been suggested for use on vehicles having manual gear shifts but generally these are quite complex systems which have not found wide acceptance because of the high cost involved as well as other factors including some of their operating characteristics. For example, the clutch may be engaged too suddenly so as to cause the vehicle to start abruptly and perhaps even to stall the motor. If this undesirable feature is compensated for by adjusting the system so that the clutch engagement is slow, very often an undesirable amount of slippage occurs and the clutch plates rapidly become worn to a point where they require replacement.

I overcome the above as well as other disadvantages of the previously suggested systems by a providing mechanism which will engage the clutch smoothly yet positively with the rate and pressure of engagement being determined by the speed of the engine. The driver then is able to shift gears without being required to declutch in the normal manner and the gear shifting can quite readily be synchronized with the automatically performed operation of the clutch. The mechanism, which is simply constructed and easily installed and serviced, is vacuum operated with the car engine providing the source of vacuum so that no additional power units are required for the vehicle.

In drawings which illustrate a preferred embodiment of the invention,

FIG. 1 is a diagrammatic view of a clutch control mechanism, in accordance with the present invention, FIG. 2 is a vertical section, part in elevation, of a clutch control means and valve means of the mechanism, FIG. 3 is a vertical section, parts broken away, taken on the line 3—3 of FIG. 2, FIG. 4 is an enlarged horizontal section taken on the line 4—4 of FIG. 2, FIG. 5 is a plan of an inlet valve disc as viewed from the underside, FIGS. 6 to 9 are diagrammatic views showing the operating sequence of the inlet valve.

Figure 10:
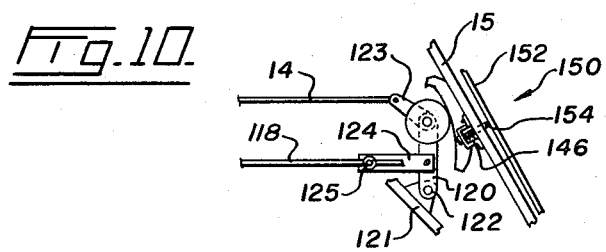
Figure 11:
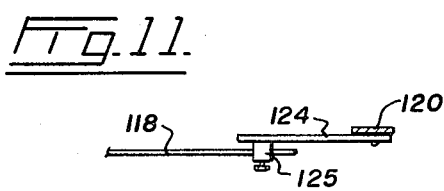

FIG. 10 is a detail view, part in section, showing a control switch mounted on the gas pedal, and FIG. 11 is a fragmentary plan view showing a wire connection between the gas pedal and the inlet valve.

Referring first to FIG. 1, the numeral 10 indicates an automobile engine which is fitted with a carburetor 11. Throttle valve 12 of the carburetor is operatively connected by a Bowden cable 14 or other suitable linkage to an accelerator pedal 15. Alongside the accelerator or gas pedal 15, there is another foot pedal 16 for controlling a friction clutch 17 which serves to connect the engine 10 to a manually operated transmission (not shown) of the vehicle.

The clutch control mechanism which forms the basis of this invention is generally indicated at 20 and includes means generally indicated at 24 for moving the clutch 17 between engaged and disengaged positions. As shown best in FIG. 2, the clutch operating means 24 comprises a casing 25 provided with parallel side walls 26 and 27 and a peripheral wall 28. Secured to wall 27, is a mounting plate 30 used to attached the casing 25 to a suitable part of the vehicle. The wall 28 of the two-part casing 25 is provided with connecting flanges 32 and clamped between these flanges is a rubber diaphragm 33 which divides said casing into a vacuum chamber 34 and an air chamber 35, the latter chamber being opened to atmosphere through a central opening 37 formed in the casing wall 27 and the mounting plate 30. A bolt 40 secured to the center of the diaphragm 33 is connected by a short length of claim 41 to the clutch pedal 16 (FIG. 1). The means 24 is vacuum operated and when the chamber 34 is evacuated, the diaphragm 33 is moved close to the wall 26 which movement disengages the clutch 17. Conversely, when chamber 34 is pressurized, the diaphragm 33 is moved alongside the wall 27 and the clutch 17 is allowed to engage with the necessary engaging pressure being applied by the plate-clamping springs (not shown) normally fitted to the friction clutch of a vehicle.

The difference in air pressure needed to operate the clutch operating means 24 is developed by the engine 10 and therefore, the present mechanism 20 is provided with a fluid circuit generally indicated at 45 in FIG. 1. Circuit 45 comprises a tube 46 which is connected to the barrel of the carburetor 11 below the throttle valve 12. The tube 46, which is fitted with a one-way valve 47, is connected to a vacuum tank 48 and another tube 49 is also connected to this tank. Still another tube 50 is connected to the carburetor 11 above the throttle valve 12.

Included in the fluid circuit 45, is valve means generally indicated at 54 for controlling the flow of air into and out of the clutch operating means 24. As shown best in FIGS. 2, 3 and 4, the valve means 54 comprises an outlet valve 56 and an inlet valve 58 both of which are housed in a body 60 suitably secured to the wall 26 of the casing. Valve 56 is provided with a seat 62 which extends across the hollow body 60 to provide an upper chamber 63 and a lower chamber 64. A vertically movable stem 66 is slidably supported by the seat 62 and this stem is fitted with spaced discs 67 and 68. Fitted to the stem 66, is a spring 70 which normally holds the disc 67 against the top surface of the valve seat 62 whereby to close off circumferentially spaced ports 72 formed in said valve seat. The upper chamber 63 has a top wall which provides a seat 74 for the valve disc 68 and said chamber is connected to the vacuum chamber 34 by a passage 75. The tube 49 from the vacuum tank extends into the lower chamber 64, see FIG. 2. Thus, when the outlet valve 56 is opened to lift the disc 67 off the seat 62 and place the disc 68 on the seat 74, the vacuum chamber 34 is connected to the vacuum tank 48 through the passage 75, chamber 63, ports 72, chamber 64, and tube 49. Whenever chamber 34 is emptied of air in this manner, atmospheric air within the chamber 35 forces the diaphragm 33 to the left (FIG. 2) whereby to disengage the clutch 17.

To operate the outlet valve 56, the mechanism 20 is provided with an electric circuit generally indicated at 80 (FIG. 1) and including a solenoid 81 which is bolted to the underside of the valve body 60 as shown in FIGS. 2 and 3. Solenoid 81 has a vertically movable plunger 82 (FIG. 2) which extends upwardly into the lower chamber 64, the plunger being enclosed by a coil 83. When the coil 83 is energized as will be later described, the plunger 82 is driven upwardly to force the stem 66 in the same direction thus opening the outlet valve 56.

The inlet valve 58 of the valve means 54 has a rotary disc 86, see FIGS. 3, 4 and 5 for example, the disc being rotatably mounted on top wall 87 of the valve body 60 by means of a spindle 88. A cap 90 is bolted to the top wall 87 and a spring 91 beneath this cap holds the disc 86 in slidable engagement with said top wall. The top wall 87 has an upstanding pin which serves as a stop 93 (i.e. FIG. 4) for the disc 86, said disc having circumferentially spaced lugs 94 and 95 adapted to engage this stop pin. Thus, the rotary disc 86 can be rotated through approximately 90° with the lugs 94 and 95 engaging the stop pin 93 to halt further turning movement.

Referring now particularly to FIG. 5, the underside of the rotary disc 86 will be seen to be provided with a substantially T-shaped recess 98 having a small radial portion 98A which extends across and around the spindle 88, and a relatively large arcuate portion 98B.

The valve body 60 is provided with passages 101, 102 and 103 all of which appear on the top wall 87, see particularly FIGS. 6 to 9. Passage 101 extends angularly downwards from wall 87 to enter the passage 75, see FIG. 2, thus connecting with the vacuum chamber 34. Passage 102 extends downwardly from wall 87 to connect with the inner end of the tube 50 as shown also by dotted lines in FIG. 3. Passage 103 (FIG. 3) inclines downwardly from wall 87 to the valve seat 74 to connect with the chamber 63 and it will be noticed this passage is of a relatively small diameter as compared with passages 101 and 102 so as to be restricted. The upper end of the passages 101, 102 and 103 are circumferentially spaced apart on the wall 87 as shown in FIGS. 6 to 9, the passages being disposed in an arc which will enable them to connect with the recess 98 when the valve disc 86 is rotated on the top wall 87.

The inlet valve 58 is suitably connected to the gas pedal 15 by means generally indicated at 106 which enables up and down motion of the pedal to be transmitted to the valve disc 86 as rotary motion. As shown in FIGS. 1 to 4, the motion transmitting means 106 comprises a vertical shaft 107 which is rotatably mounted on a bracket 108 secured to the casing 25. A short horizontal arm 110 is secured to the lower end of shaft 107 and this arm is connected by a push-pull wire 111 to a screw 112 which is secured to disc 86, the wire passing freely through a hole 114 (FIGS. 3 and 4) formed in the cap 90. The upper end of shaft 107 is fitted with a slightly longer horizontal arm 117 and a push-pull wire 118 connects the outer end of this arm to an arm 120 (FIG. 10) which is mounted on the floorboards 121 of the vehicle so as to be rocked about a transverse pivot pin 122 by operation of pedal 15. Cable 14 is also connected to arm 120 as at 123. As shown in FIGS. 10 and 11, the gas pedal end of the wire 118 is secured to arm 120 by a pivotedly mounted link 124 on which an adjusting device 125 is mounted to slidably receive the wire end. Thus, the effective length of the wire 118 can be adjusted to suit a particular vehicle. The carburetor end of wire 14 is adjustably secured by a fitting 127, see FIG. 1 only, to an arm 128 controlling the operation of the throttle valve 12. The fitting 127 provides for a very fine adjustment of the effective length of the wire 14 and this, combined with the adjustment provided for the wire 118, enables the operation of the valve 12, pedal 15 and clutch 17 to be suitably synchronized.

The gas pedal 15 is secured to the floorboards 121 of the vehicle by a hinge 131 (FIG. 1) and the usual spring (not shown) is provided to bias the pedal towards the fully raised position. In this fully raised position, the wire 118 holds the rotary disc 86 in the position shown in FIGS. 4 and 6 where the lug 94 engages the stop pin 93. Thus, when the pedal 15 is depressed, the wire 118 rotates the rotary disc 86 counterclockwise (FIG. 40 until the lug 95 contacts the stop pin 93.

Referring again to FIG. 1, the electric circuit 80 is connected to the electrical system of the vehicle and more particularly to the charging circuit 130 which includes the several elements contained in box A. These elements or their equivalents as well as others which have been omitted for the sake of clarity are found in every vehicle suitably connected together and the ones illustrated consist of the battery 132, the generator 133, the generator charge light 134, and the voltage regulator (box B) which includes a cutout relay 136. The vehicles ignition switch is indicated by the numeral 137. Included in the circuit 80 is a master switch 140, relays 142 and 144, the solenoid 81, and a normally closed control switch 146.

The switch 146 is mounted on the gas pedal 15, see particularly FIG. 10, and actuating means generally indicated at 150 is provided whereby said normally closed control switch is opened just before said pedal is depressed to open the inlet valve 54 and simultaneously accelerate the engine. As shown diagrammatically in FIG. 1, and in detail in FIG. 10, the actuating means 150 comprises a plate 152 which is hingedly secured at its lower end to the pedal 15 as indicated by the numeral 153 in FIG. 1 only. The upper or free end of the plate 152 normally rests upon a spring-pressed operating plunger 154 of the control switch 146. Thus the switch 146 is closed whenever the driver has his foot off the gas pedal 15, the switch being opened by initial foot pressure applied to depress said pedal.

In explaining the operation of the clutch control mechanism 20, it will be assumed that the vehicle fitted with the invention is standing still, the engine 10 is idling, the transmission is in neutral and the driver has his foot off the accelerator. Since the switches 137, 140 and 146 are now closed, the relay 142 and therefor the solenoid 81 are both energized. This opens the outlet valve 56 whereupon the vacuum chamber 34 is evacuated and atmospheric air within the chamber 35 presses the diaphragm 33 to the left (FIG. 2) to disengage the clutch 17. The inlet valve 58 at this time is in the fully closed position shown best in FIG. 6.

The driver manually shifts the car into low gear and places his foot on the gas pedal 15 ready to accelerate the vehicle. Plate 152 is moved by initial foot pressure to open the control switch 146 whereupon the circuit 80 is broken and the outlet valve 56 is closed. Closure of valve 56 removes the disc 68 from the seat 74 and this uncovers the lower end of the restricted passage 103.

Initial movement of the pedal 15 towards the floorboards 121 causes the valve disc 86 to be rotated to the position shown in FIG. 7 whereupon the passages 102 and 103 are placed in communication with one another by the recess 98 in said valve disc. Air at greater than atmospheric pressure from the carburetor 11 can now reach the vacuum chamber 34 but the restricted passage 103 will permit only a limited flow of this air so that the diaphragm 33 is moved slowly to the right (FIG. 2) whereby to gradually engage the clutch 17.

Continued downward movement of the pedal 15 moves the valve disk 86 to the FIG. 8 position where the recess 98 starts to sweep over the passage 101 which is considerably larger in diameter than the restricted passage 103. Passage 101 is gradually exposed to allow a progressively increasing flow of air to the chamber 34 whereby a corresponding increasing pressure is applied to force the diaphragm 33 to the right (FIG. 2) and further engage the clutch 17.

Finally the disk 86 reaches the FIG. 9 position where the passages 101 and 102 are both spanned by the recess 98 whereupon the valve chamber 34 is fully pressurized and the clutch 17 is engaged with maximum clamping pressure. Thus, the car clutch 17 is engaged as the gas pedal 15 is depressed and this is done automatically by the action of the driver accelerating the motor.

To shift gears, the driver simply releases his foot pressure from the gas pedal 15 to allow the switch 146 to close and this action automatically disengages the clutch 17 whereupon the driver can shift gears in the normal manner. Thus, the mechanism 20 engages and disengages the clutch 17 automatically according to the position of the gas pedal 15 and the driver is relieved of at least part of the work involved in driving a manual shift vehicle. If at any time the driver does not want the mechanism 20 to operate, i.e. when coasting down a hill where undesirable free wheeling may result, he flips switch 140 and this breaks the circuit 80 and renders the mechanism inoperative so that the clutch 17 can be engaged and disengaged by the driver as in any vehicle fitted with a manual shift transmission.

Assuming now that the car is in, say, high gear and the engine R.P.M.'s are allowed to drop to a point where they might be inclined to stall the engine the clutch control mechanism 20 responds automatically to compensate for this condition. This is achieved by the action of the governor solenoid 144 which is energized whenever the engine approaches the stalling point by virtue of its connection to the charging circuit 130 of the vehicle. Such a circuit 130 is present in all vehicles and its cutout relay 136 is designed to close and open circuit 130 between the battery 132 and the generator 133. When the generator voltage output reaches the value for which the relay 136 is adjusted, contact 156 of said relay closes and current flows from the generator towards the battery. When generator output voltage falls below the selected setting, contact 156 opens to prevent battery discharge through the generator and, in this particular circuit 130, the red charge light 134 is energized.

The control switch 146 is open during the near stall since the driver will have his foot on the accelerator attempting to move the car along in high gear. Switch 146, when open, normally would deenergize solenoid 81 whereby to close the outlet valve 56 and engage the clutch 17 but said switch is now by-passed when the cutout relay 136 energizes the governor solenoid 144, thus connecting the solenoid 81 directly to the power source which opens the valve 56 so as to cause disengagement of the clutch. Once the speed of the engine builds up and the charging circuit 130 is again supplying power to the battery, solenoid 144 is deenergized and the outlet valve 146 is controlled by the opening and closing of switch 146 as before.

From the foregoing, it will be apparent I have provided a clutch control mechanism which converts a manual shift vehicle to one which is commonly referred to as a stick-shift wherein the necessity of physically operating the clutch when starting and shifting gears is eliminated. Since the operation of the mechanism is sychronized with the operation of the gas pedal, a particularly smooth and positive clutch action is achieved. The driver has full control over the mechanism at all times and can easily render it inoperative if he feels it might interfere with the safe operation of the vehicle.

I claim:

1. Clutch control mechanism for a vehicle having an engine, a clutch normally operated by a pedal, and a gas pedal, comprising a casing, a diaphragm extending across the casing to provide a vacuum chamber and a chamber open to atmospheric air, mechanical means operatively connecting the diaphragm to the clutch pedal, a fluid circuit connecting the casing to a source of pressure differential developed by the engine and including an outlet valve and an inlet valve for controlling the flow of fluid through said circuit, an electrically operated device for opening and closing the fluid outlet valve, a control switch associated with the gas pedal and normally connecting the electrically operated device with a source of electric power whereby the fluid outlet valve is opened to evacuate the vacuum chamber and disengage the clutch when the engine is operated substantially at idling speed, means for actuating the control switch to close the fluid outlet valve prior to the opening of the fluid inlet valve, said fluid inlet valve having a restricted passage and a relatively large passage controlled by a rotary disc, motion transmitting means operatively connecting the rotary disc to the gas pedal, said rotary disc being moved in response to initial depression of the gas pedal to connect the restricted passage to the vacuum chamber whereby to slowly pressurize the vacuum chamber and cause corresponding engagement of the clutch, and the rotary disc subsequently being moved by further depression of the gas pedal to progressively connect the relatively large diameter passage to the vacuum chamber whereby to supply increasing amounts of pressurizing air to the vacuum chamber and thereby positively engage the clutch.

2. Clutch control mechanism as claimed in claim 1, and including a governor relay electrically connected to charging circuit of the vehicle and adapted to open the outlet valve when the control switch is open and the engine approaches stalling speed.

3. Clutch control mechanism for a vehicle having an engine, a clutch, and a gas pedal, comprising means for operating the clutch between disengaged and engaged positions, said clutch operating means being operated by fluid suction developed by the engine, an electrically operated fluid outlet valve for the clutch operating means, said fluid outlet valve has a disc adapted to close off the restricted passage when said valve is open, a control switch electrically connecting the fluid outlet valve to a source of electric power and operating to effect disengagement of the clutch when the engine is running substantially at idling speed, a fluid inlet valve for the clutch operating means, motion transmitting means operatively connecting the fluid inlet valve to the gas pedal whereby said inlet valve is progressively opened to effect engagement of the clutch as said gas pedal is depressed to accelerate the engine, and means for actuating the control switch to close the outlet valve prior to the opening of the inlet valve.

* * * * *